(12) United States Patent
Ford et al.

(10) Patent No.: US 6,336,667 B1
(45) Date of Patent: Jan. 8, 2002

(54) LATCH MECHANISM

(75) Inventors: Michael D. Ford, Independence, MO (US); Gary Hannah, Merriam, KS (US); Sebastien A. Ramus, Lawrence, KS (US); Sara G. Weinstein, Overland Park, KS (US)

(73) Assignee: B/E Aerospace Intellectual Property Inc., Wellington, FL (US)

( * ) Notice: Subject to any disclaimer, the term of this patent is extended or adjusted under 35 U.S.C. 154(b) by 0 days.

(21) Appl. No.: 09/330,683

(22) Filed: Jun. 11, 1999

(51) Int. Cl.$^7$ ................................................. E05C 7/00
(52) U.S. Cl. .................... 292/25; 292/11; 292/DIG. 11; 292/DIG. 65; 128/206.27
(58) Field of Search ............................... 292/11, 24, 25, 292/30, 56, DIG. 11, DIG. 65; 128/206.27; 285/306, 310, 319

(56) References Cited

U.S. PATENT DOCUMENTS

| | | | | |
|---|---|---|---|---|
| 2,446,113 A | * | 7/1948 | Spiller | 292/30 |
| 2,506,943 A | * | 5/1950 | Shreve | 292/30 |
| 2,887,124 A | * | 5/1959 | Mehl | 137/614 |
| 3,813,119 A | * | 5/1974 | Panici | 292/122 |
| 3,981,302 A | * | 9/1976 | Veit | 128/203 |
| 4,021,066 A | * | 5/1977 | McShane | 292/144 |
| 4,023,874 A | * | 5/1977 | Jong | 312/291 |
| 4,087,013 A | * | 5/1978 | Wiley | 214/392 |
| 4,429,759 A | * | 2/1984 | Clark | 180/89.14 |
| 4,481,945 A | * | 11/1984 | Levine | 128/206.27 |
| 4,559,939 A | * | 12/1985 | Levine | 128/201.28 |
| 4,909,247 A | * | 3/1990 | Terrise | 128/206.27 |
| 5,062,668 A | * | 11/1991 | Onderka | 292/25 |
| 5,161,833 A | * | 11/1992 | McNaughton | 285/319 |
| 5,901,992 A | * | 5/1999 | Winkler | 292/270 |

* cited by examiner

*Primary Examiner*—Gary Estremesky
(74) *Attorney, Agent, or Firm*—Hovey, Williams, Timmons & Collins

(57) ABSTRACT

A compact, lightweight latch (38) especially adapted for use with an emergency deployment oxygen mask container (20) is provided which is made up of a minimum of parts and which can be delatched in multiple ways. The latch (38) includes a latch assembly (40) designed to be mounted in the oxygen mask container box (22) and a cooperating latch pin (44) secured to a cover (24). The assembly (40) has a primary latch body (46) supporting a diaphragm (48), latch member (50) and shiftable piston (52); the latch member (50) includes a plurality of laterally displaceable, hook-shaped locking legs (86) configured to interfit with latch pin (44). The piston (52) is shiftable in opposite axial directions within latch member (52), and cooperating surfaces on the member (50) and piston (52) serve to positively displace the latching legs (86) in response to piston movement. During pneumatic operation, the piston (52) is shifted within latch member (50) under the influence of diaphragm (48). The latching member (50), piston (52) and latch pin (44) are preferably in substantial axial alignment, and a passageway (116) in the latch pin (44) allows use of push or pull rods (126, 128) for manual delatching.

25 Claims, 3 Drawing Sheets

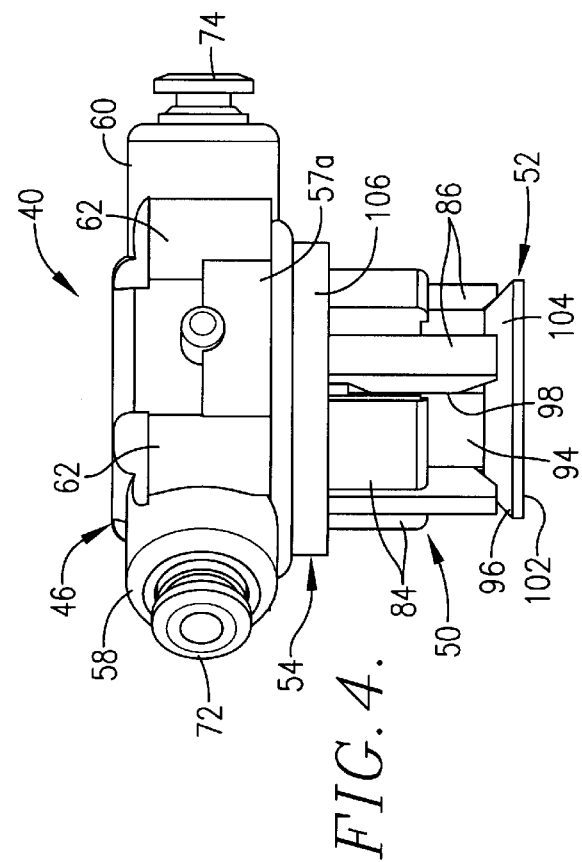
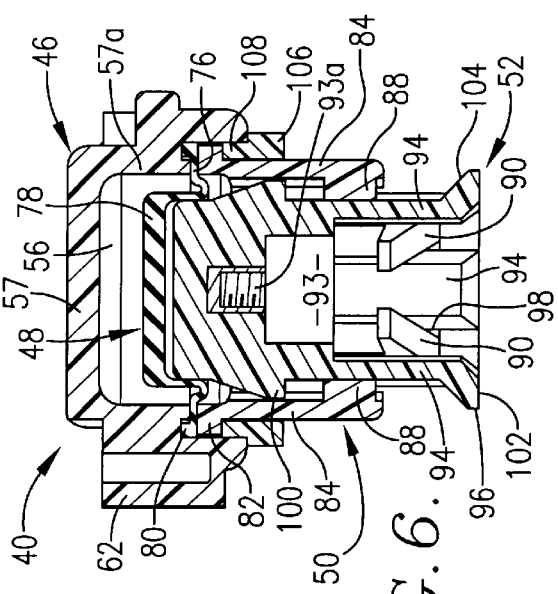
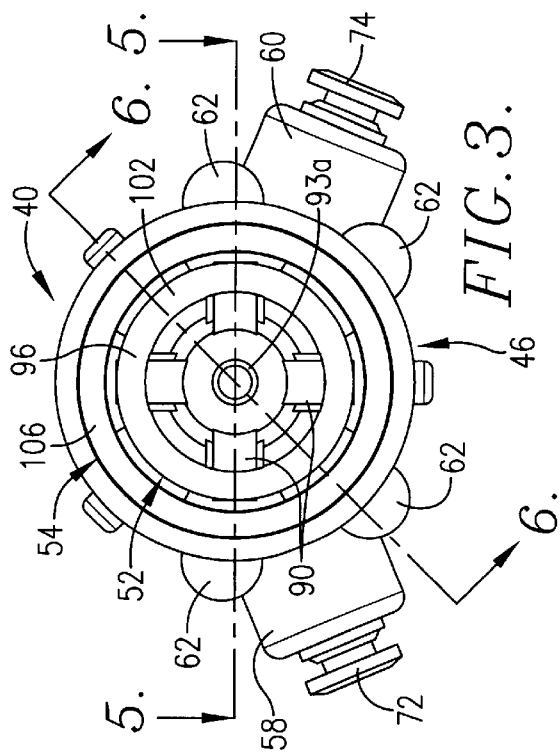
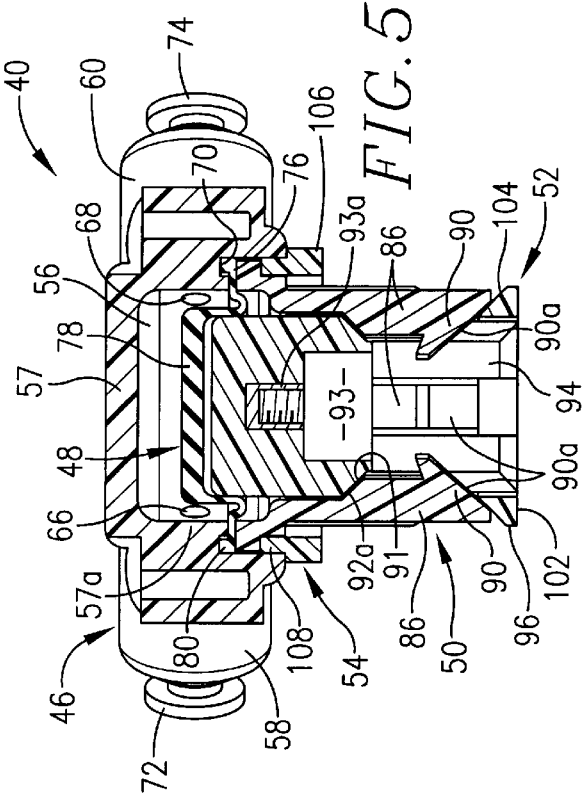

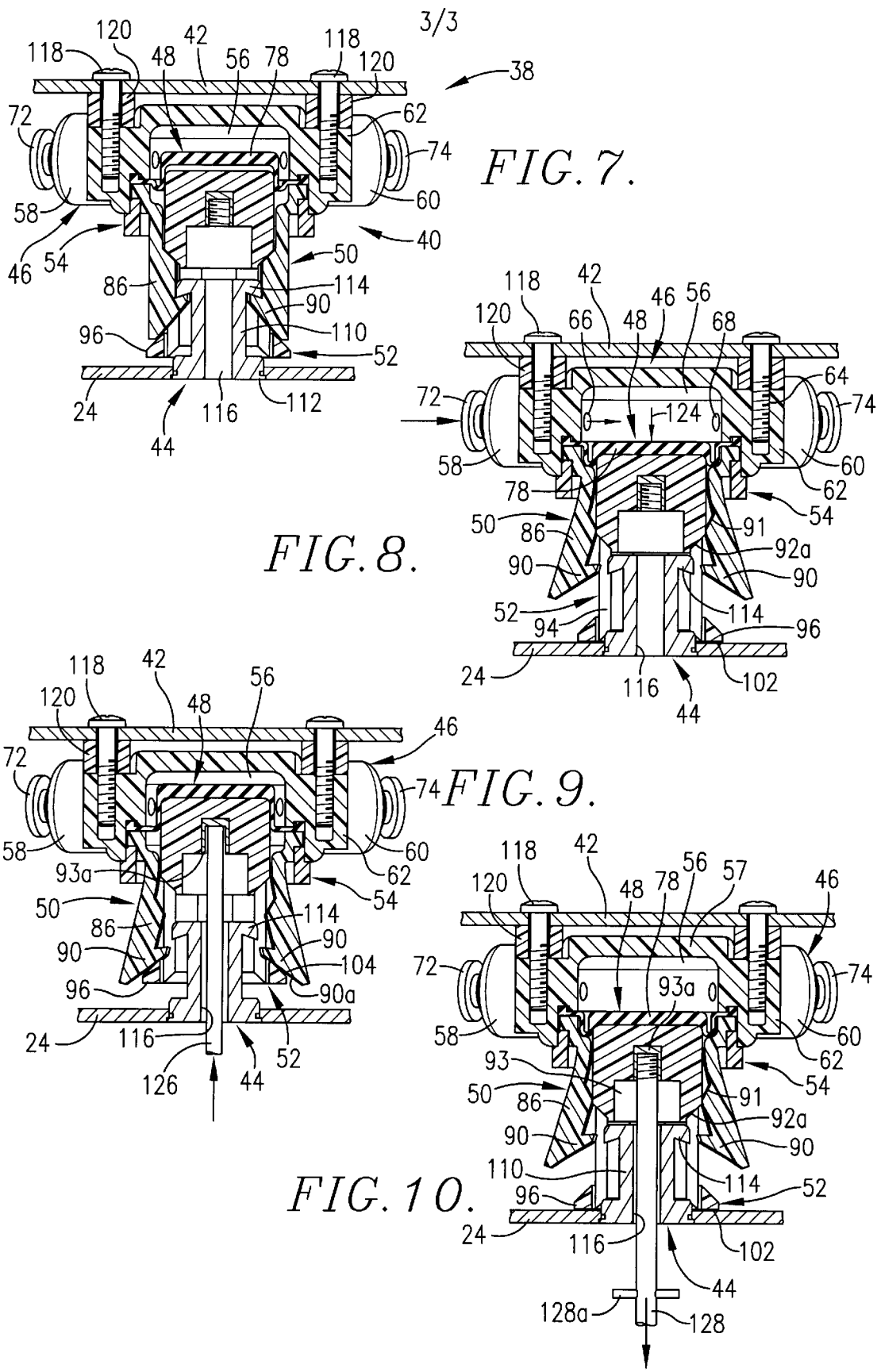

LATCH MECHANISM

BACKGROUND OF THE INVENTION

1. Field of the Invention

The present invention is broadly concerned with an improved latch mechanism of simple, compact, lightweight construction using only a minimum of parts, and which is especially designed for use with emergency deployment oxygen mask containers used in passenger aircraft. More particularly, the invention pertains to such a latch mechanism which includes cooperating, substantially axially aligned components including displaceable latch elements and an operating piston shiftable in opposite directions relative to the latch elements; the piston includes structure for positively displacing the latching elements upon piston movement in either axial direction.

2. Description of the Prior Art

A number of latch mechanism designs have been proposed for use in emergency deployment oxygen mask containers situated above or adjacent passenger seats and in other locations such as lavatories in aircraft. Such mechanisms must meet a number of rather stringent requirements. First and foremost, the latch mechanisms must operate essentially flawlessly in the event of a cabin depressurization or other incident where supplemental passenger oxygen is required. At the same time, size and weight are sometimes controlling considerations in aircraft design, and therefore the container latch mechanisms must be compact and lightweight.

A common type of latch mechanism used in this context is a pneumatic latch having a clip and an actuator, where a latch pin is squeezed into the clip and is released when enough upward force is applied to the latch pin. This mechanism relies upon the balance of force between the clip tension and the upward force on the pin. One disadvantage of this design is that the force of the door on the pin affects the force required to open the latch, and since that force is dependent on how tightly the container is packed, the opening force is inconsistent. Further, the metal clip is likely to fatigue over time, causing it to be less able to restrain the pin. Therefore, the tolerance of opening force for the latch needs to be large to account for this variability. This latch design also requires a rather large number of parts, making it heavier and more costly to produce and repair. Finally, only two operating methods can be used with this mechanism, and thus simplified deployment testing is not possible.

Another common latch mechanism employs a complicated assembly in which a short hollow column attached to the container cover door is pushed over the top of a locking mechanism where friction against two protruding balls holds the column in place. When this mechanism is actuated, a plunger core with variable thickness moves to allow the restraining balls to retract and thus no longer make contact with the locking column. The complexity of this design, with five moving parts, makes it costly to manufacture and repair. This mechanism is also relatively heavy and tall, and would not be usable in new short-height container designs. Again, there are only two opening methods with this design, pressurization and thin rod insertion. In the latter case, the design is deficient in that if the rod is inserted at an angle, it can miss the plunger altogether and/or damage the assembly.

Electrically actuated latch mechanisms have also been proposed. In one design, three jaws are locked around a latch pin. In operation, a plunger releases the jaws, with the plunger being activated by a lever controlled by a solenoid. However, this unit is relatively heavy and has only two opening methods. Another electrical design exists in which a locking ball mechanism/latch pin is employed to keep the container cover closed. This unit includes over thirty parts (including five springs), and is thus large and heavy. Latch release is indirect: a solenoid drives a spring loaded cam and shaft which pushes another spring-loaded piston back to release the three balls locking the latch pin. A manual release button associated with this unit requires a separate mechanism which also works indirectly. Another mechanism of this general type uses the same dual shaft principle to indirectly move a piston. In this design, a hook end of a lever grabs the cover and keeps it closed; if the lever is rotated, the hook releases the door. While this design does have certain advantages, it is still a parts intensive mechanism of relatively large size.

There is accordingly a real and unsatisfied need in the art for a latch mechanism usable in emergency deployment oxygen containers which is compact, lightweight, and easy to assemble using only a minimum of parts, and wherein the latch mechanism can be opened by a variety of methods.

SUMMARY OF THE INVENTION

The present invention overcomes the problems outlined above and provides a latch mechanism for releasably latching two components together. The mechanism includes a latch assembly adapted for mounting on one of the components and has a latch member with at least one latch element displaceable between a latching position and a release position, together with a piston shiftable in opposite directions relative to the latch member. The overall mechanism also has a latch pin adapted for mounting on the other of the components and normally interfitted with the displaceable latch element for releasably latching the two components together. In preferred forms, the latch member, piston and latch pin are substantially coaxially aligned, and the piston includes structure oriented to positively displace the latch element from its latching to its release position during shifting of the piston in either of its movement directions.

Preferably, the latch member is of elongated, tubular design and includes a plurality of latch elements in the form of elongated, laterally displaceable latching legs each equipped with a hook-shaped end engageable with the latch pin. Similarly, the piston has a plurality of elongated slots with each of the legs received within a corresponding slot. The piston and displaceable legs have cooperating surfaces so that, upon movement of the piston in either axial direction, the latching legs are displaced laterally so as to effect delatching.

The latch mechanism is normally operated pneumatically, although in alternative designs, various operating mechanisms can be adopted. These would include electrical, mechanical, electromagnetic or chemical means for shifting of the mechanism piston. Hence, the preferred pneumatic/diaphragm operating mechanism could readily be replaced by a number of other operationally equivalent systems such as a solenoid mechanism. Further, the design permits a number of other opening methods, such as by pushing or pulling the piston by appropriate rod manipulations.

BRIEF DESCRIPTION OF THE DRAWINGS

FIG. 3 is a bottom view of the latch mechanism, without the latch pin;

FIG. 4 is a side elevational view of the latch mechanism without the latch pin;

FIG. 5 is secctional view taken along line 5—5 of FIG. 3;

FIG. 6 is a sectional view taken along line 6—6 of FIG. 3;

FIG. 7 is a fragmentary vertical sectional view depicting the oxygen mask container assembly and the associated latch mechanism, with the latter illustrated in its latched position;

FIG. 8 is a fragmentary vertical sectional view similar to that of FIG. 7, but illustrating the latch mechanism during pneumatic opening of the latch mechanism;

FIG. 9 is a fragmentary vertical sectional view similar to that of FIG. 7, but depicting manual opening of the latch mechanism through use of a rod; and FIG. 10 is a fragmentary vertical sectional view similar to that of FIG. 7, but showing operation of the latch mechanism by a threaded rod screwed into the piston insert.

DETAILED DESCRIPTION OF THE PREFERRED EMBODIMENT

Figure 1:
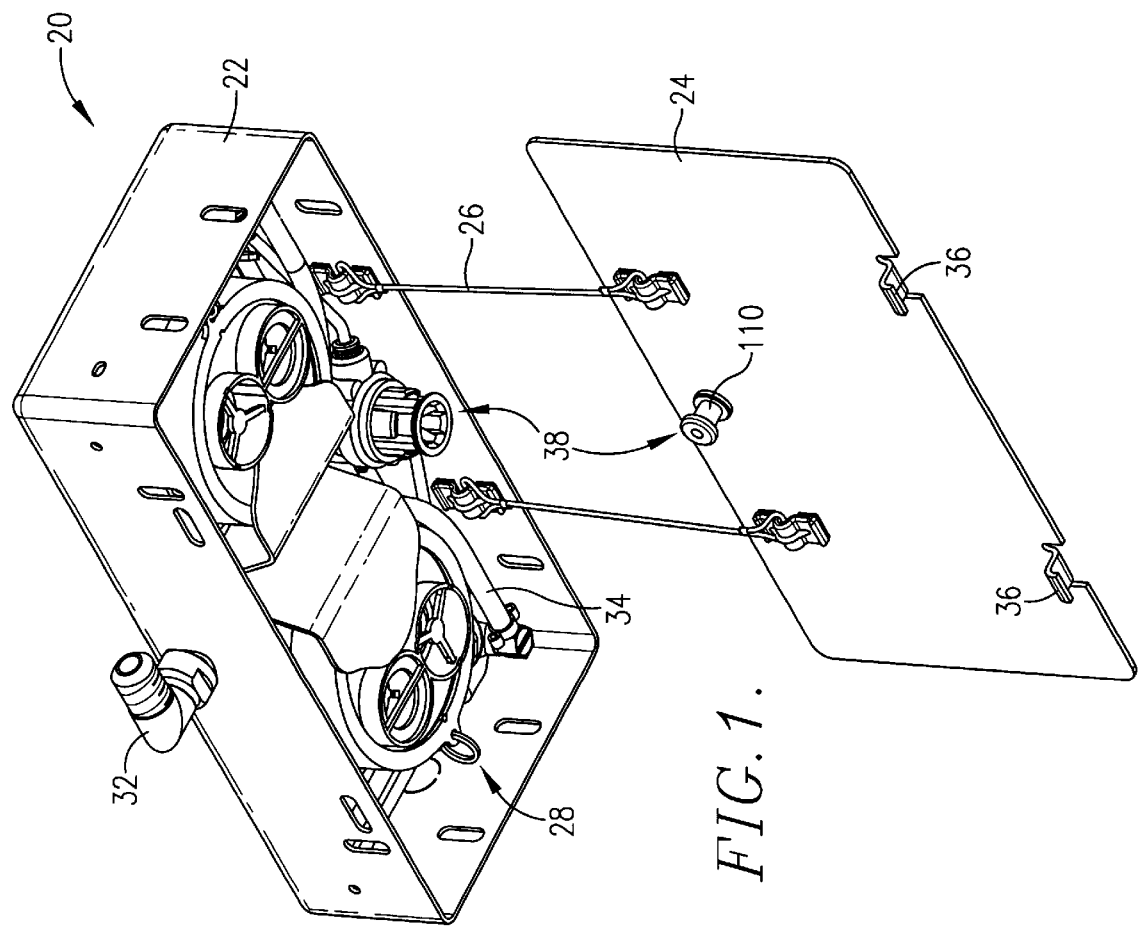
FIG. 1 is an isometric view of an oxygen mask container assembly in accordance with the invention, illustrated with the container door opened and prior to deployment of the oxygen masks.

Turning now to the drawings, and particularly FIG. 1, an emergency deployment oxygen mask container 20 is illustrated. The container 20 is in the form of a rectangular box 22 having a cover 24 secured to the box 22 by means of a pair of flexible lanyards 26. The box 22 contains a plurality (here two) of deployable oxygen masks 28 normally retained therein but which can be readily removed when cover 24 is opened; for example, when the container 20 is mounted in overhead position above passenger seats, the masks 28 will fall under the influence of gravity to a convenient use position. As is well known to those skilled in the art, the masks 28 are designed for emergency use by aircraft passengers and are coupled to a source of oxygen through nipple 32 and appropriate pneumatic lines 34. Oxygen may be delivered to the masks 28 from a central source or from chemical oxygen generators situated adjacent the container 20. The containers 20 can be connected to each other in parallel or in series depending upon the aircraft configuration and design, using larger hoses that connect to each container via nipple 32.

The cover 24 is normally retained in covering relationship to the box 22 by means of pivots 36 and a pneumatically operated latch mechanism 38. In an emergency situation such as a cabin depressurization, the latch 38 is pneumatically actuated and the cover 24 drops downwardly as shown in FIG. 1, although retained by the lanyards 26. This permits passenger access to the masks 28, which may be through a gravity drop or by pulling on an access cord (not shown).

The present invention is particularly concerned with the latch 38, which broadly comprises a latch assembly 40 adapted for mounting within the box 22 and specifically to the top wall 42 thereof (see FIG. 7), as well as a latch pin 44 designed for mounting on cover 24. As indicated above, the latch 38 is preferably pneumatically operated, although other modes of operation, e.g., by a solenoid, could also be used.

The latch assembly 40 is made up of a latch body 46, diaphragm 48, latch member 50, piston 52 and retaining ring 54. These parts are shown in exploded relation in FIG. 2, and in assembled relation in FIGS. 3–10.

Figure 2:
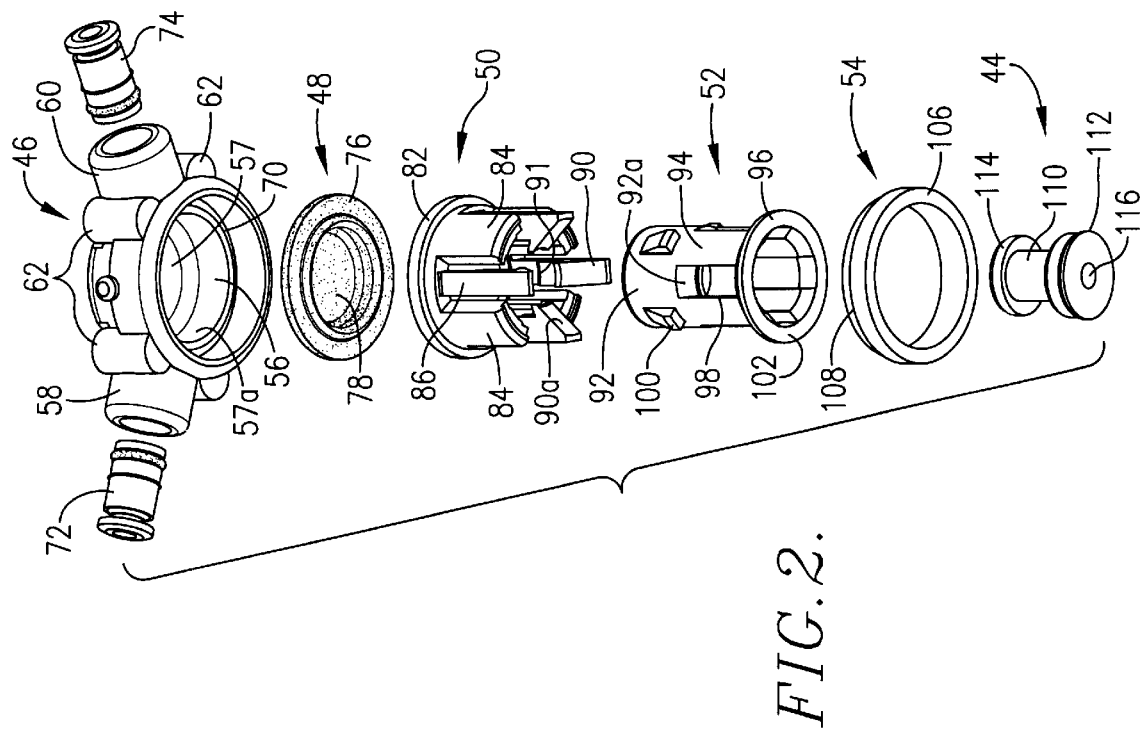
FIG. 2 is an exploded view of the door latch mechanism, depicting the parts thereof.

Latch body 46 is in the form of a synthetic resin body presenting a central diaphragm chamber 56 including a top wall 57 and a depending sidewall 57a, a pair of tubular, pressurized oxygen passageways 58, 60 and a series of mounting lugs 62 each having a threaded, screw-receiving opening 64 therein. As best seen in FIG. 8, the passageways 58–60 communicate with chamber 56 via openings 66, 68 provided in the sidewall 57a of chamber 56. The lower end of sidewall 57a as viewed in FIGS. 2 and 5, is provided with a circular diaphragm-receiving groove 70. Pneumatic connection fittings 72, 74 are slidably received within the passageways 58, 60, so as to permit connection of the latch 38 to a source of activating oxygen, and to a serially connected downstream latch provided in another container 20.

The diaphragm 48 is a circular, integral resilient member having an outermost flange 76 and a central section 78. Referring to FIG. 5, it will be observed that the flange 76 includes an upstanding annular securement rib 80 which is received within groove 70; also, the diaphragm 48 is sufficiently large to permit flexure thereof within the chamber 56.

The latch member 50 is a generally tubular, synthetic resin integral member having an uppermost ring 82 supporting a total of four circumferentially spaced, depending ribs 84 along with four depending locking legs 86 located between each pair of ribs 84. In more detail, each of the ribs 84 (see FIG. 6) extends downwardly from ring 82 and terminates with an inwardly extending projection 88 presenting an inboard, arcuate face. The legs 86 are somewhat longer than the adjacent ribs 84, and terminate at their lower ends with hook-shaped, inwardly extending locking sections 90 having lowermost oblique surfaces 90a (see FIG. 5). Each of the legs 86 also presents an oblique, upwardly facing surface 91. The legs 86 are laterally displaceable for purposes to be made clear.

The piston 52 is slidable within latch member 50 and includes an uppermost, circular in cross-section block 92, a depending annular wall 94 and an annular lowermost foot 96. Block 92 presents a central, circular opening 93, and is equipped with a metallic, internally threaded insert 93a. In addition, the block 92 presents a lower, oblique, inwardly extending operating wall 92a which is positioned adjacent the surfaces 91 of the locking legs 86. As best seen in FIG. 2, the wall 94 has a total of four axially extending, circumferentially spaced slots 98 therein which are adapted to receive the respective locking legs 86 of latch member 50. Additionally, the piston is provided with a total of four outwardly extending slide blocks 100 forming a part of the wall 94 and adjacent block 92; it will be observed that the slide blocks 100 are oriented between the spaced slots 98. The foot 96 presents a flattened lower surface 102 as well as an opposed, annular oblique upper operating surface 104.

The retaining ring 54 is likewise formed of aluminum and presents a stepped configuration in cross-section. This includes a main body 106 as well as an upstanding locking projection 108.

The latch assembly 40 is assembled as best illustrated in FIG. 5. That is, the diaphragm 48 is situated within chamber 56 with the securement rib 80 located within groove 70, and with the remainder of the flange 76 loosely positioned so as to permit up and down movement of the central section 78 of the diaphragm. The latch member 50 is in abutment with the lower surface of the diaphragm flange, with the ring 82 serving to maintain the flange and securement rib in place. The piston 52 is located within the confines of latch member 50, with the rib projections 88 engaging the outer surface of piston wall 94 between the slots 98, and with the locking legs 86 situated within the slots 98. Note that in this position the surface 92a of piston block 92 is in face to face proximity with the surfaces 91 of the locking legs. Note also that the locking leg surfaces 90a are in close adjacency with the upper operating surface 104 of the foot 92 of piston 52. Finally, the retaining ring 54 is employed to secure all of the latch assembly components together, i.e., the upper projection 108 thereof is press fitted into the annular space between piston wall 94 and the depending wall 57a of chamber 56.

The latch pin 44 comprises an upright, annular aluminum body 110 presenting a lowermost securement flange 112 and an uppermost locking flange 114. A central passageway 116 is provided through the body 110 as shown.

In use, the latch assembly 40 is secured to wall 42 of box 22 by means of screws 118 extending into the threaded openings 64 of the lugs 62. Typically, annular resilient spacers 120 are provided about the shank of each screw 118 to engage the underside of wall 42 and the upper surface of chamber 56. The latch pin 44 is mounted on cover 24 within an appropriately sized opening 122 sized to accommodate the flange 112. The latch assembly 40 and latch pin 44 are strategically located so that when cover 24 is in its closed position covering box 22, the latch pin 44 interfits with the latch assembly 40. In this orientation (see FIG. 7), the latch member 50, piston 52 and latch pin 44 are in substantial axial alignment. Moreover, the hook sections 90 of the locking legs 86 engage the underside of locking flange 114 so as to securely hold the cover 24 in place.

As indicated, FIG. 7 illustrates the overall latch 38 in its normal position closing the box 22 with cover 24. There are a number of ways in which the latch 38 may be operated so as to cause cover 24 to open the box 22 and assume the position of FIG. 1. Turning first to FIG. 8, an operational sequence is depicted wherein a source of pressurized oxygen is delivered via passageway 58 for delatching purposes. When this occurs, air pressure is generated within chamber 58 above diaphragm 48, so as to push the diaphragm downwardly, as illustrated by arrow 124; this also shifts piston 52 downwardly. As this occurs, the piston surface 92a comes into contact with the adjacent locking leg surfaces 91 thereby laterally deflecting the legs 86 outwardly so that the hook-shaped sections 90 move out of interengagement with flange 114 of latch pin 44. At the same time, because of the downward movement of the piston 52, the lower surface 102 of foot 96 comes into engagement with the inner surface of cover 24. This creates a positive displacement force serving to positively move the cover 24 out of its closed position. Hence, the cover 24 is free to drop downwardly to its FIG. 1 position.

Another method of actuating latch 38 is shown in FIG. 9. In this instance, a pin 126 is inserted through passageway 116 of latch pin 44 and into the piston block insert 93a. Application of such an upwardly directed force serves to move the piston upwardly. When this happens, the upper foot operating surface 104 comes into engagement with the oblique lowermost surfaces 90a of the locking legs 86. As a consequence, the legs 86 are deflected laterally outwardly, to again delatch the latching pin 44. The cover 24 is then free to move downwardly to its open position.

FIG. 10 depicts a still further method of operating the latch 38. In this instance, a threaded rod 128 is extended upwardly through the passageway 116 and is threaded into piston block insert 93a. When it is desired to open the latch 38, the user need only pull downwardly on the rod 128 (which may be conveniently equipped with a grasping hook or the like) to thereby move the piston 52 downwardly. As will be readily appreciated, such downward movement of the piston 52 accomplishes opening of the latch 38 in a manner essentially identical with that described in connection with FIG. 8.

Another feature of this operating method is that the rod 128 may be equipped with an external stop or flag (such as a crosspin 128a) spaced somewhat downwardly from the latch pin 44 which will allow the door to open slightly but not enough for the masks 28 to drop. This feature allows testing of the latches while avoiding the labor of repacking the masks into the containers, which is cumbersome and time-consuming. It will also be appreciated that while threading is shown as a way of inserting a pin and stopping device, other ways of non-permanently inserting such a pin and stopping device into the latch could be used, such as complementary hooks, slots, or Velcro.

Finally, in an emergency situation, a user need only grasp cover 24 and pull it downwardly. Such a downwardly directed force, if of sufficient magnitude, will deflect the locking flange 114 of pin 44 sufficiently to clear the hook-shaped sections 90 of the locking legs 86, thereby permitting the cover 24 to fall to its FIG. 1 position. It will be appreciated, however, that this last method of delatching is undertaken only in emergency situations.

It will thus be appreciated that the latch 38 of the invention uses a minimum of parts and is thus lightweight and easy to assemble. At the same time, the latch assembly can be operated using a variety of techniques as explained previously.

We claim:

1. A latch mechanism for releasably latching two components together, said latch mechanism comprising:

a latch assembly adapted for mounting on one of said components and including a latch member having at least one latch element displaceable between a latching position and a release position, and a piston shiftable in opposite directions relative to said latch member; and a latch pin adapted for mounting on the other of said components and engaged with said latch element for releasably latching said two components together, said piston including structure oriented to positively displace said latch element from said latching position to said release position during shifting of said piston in either of said directions, to cause said latch element to disengage said latch pin and delatch said two components.

2. The latch mechanism of claim 1, said piston being substantially coaxial with and shiftable relative to said latch member.

3. The latch mechanism of claim 1, said latch member including a plurality of latch elements, each of said elements comprising an elongated leg having a generally hook-shaped end engageable with said latch pin.

4. The latch mechanism of claim 3, said piston including a plurality of elongated slots with each leg received within a corresponding slot.

5. The latch mechanism of claim 1, said piston having a foot adjacent one end thereof for directly engaging said other component upon shifting of the piston in one of said directions.

6. The latch mechanism of claim 5, said foot including a surface remote from said other component engageable with said latching element upon shifting of said piston in the other of said directions.

7. The latch mechanism of claim 1, said latch assembly including a latch body attachable to said one component and supporting said latch member and piston.

8. The latch mechanism of claim 7, said latch body including a pneumatically moveable diaphragm adjacent said piston, and an air passageway communicating with said diaphragm for delivery of pressurized air against the diaphragm in order to thereby move the diaphragm and shift said piston.

9. The latch mechanism of claim 1, said latch pin and piston being substantially coaxial, said latch pin being of annular configuration and presenting a release pin opening therethrough permitting a release pin to be inserted through the latch pin for engagement with said piston.

10. The latch mechanism of claim 9, including means for releasably holding said release pin in said latch piston.

11. A latch mechanism for releasably latching two components together, said latch mechanism comprising:
   a latch assembly adapted for mounting on one of said components and including an elongated, generally tubular latch member supporting at least one elongated latch leg laterally displaceable between a latching position and a release position, and an elongated piston presenting a recess therein, said piston at least partially telescoped within said latch member and selectively shiftable in opposite axial directions relative to said latch member and said latch leg; and
   an elongated latch pin adapted for mounting on the other of said components and received within said piston recess and engaged with said latch leg for releasably latching said two components together,
   said latch member, piston and latch pin being substantially coaxially aligned.

12. The latch mechanism of claim 11, said latch member including a plurality of latch legs, each of said legs comprising an elongated leg having a generally hook-shaped end engageable with said latch pin.

13. The latch mechanism of claim 12, said piston including a plurality of elongated slots with each leg received within a corresponding slot.

14. The latch mechanism of claim 11, said piston having a foot adjacent one end thereof for directly engaging said other component upon shifting of the piston in one of said directions.

15. The latch mechanism of claim 14, said foot including a surface remote from said other component engageable with said latching leg upon shifting of said piston in the other of said directions.

16. The latch mechanism of claim 11, said latch assembly including a latch body attachable to said one component and supporting said latch member and piston.

17. The latch mechanism of claim 16, said latch body including a pneumatically moveable diaphragm adjacent said piston, and an air passageway communicating with said diaphragm for delivery of pressurized air against the diaphragm in order to thereby move the diaphragm and shift said piston.

18. The latch mechanism of claim 11, said latch pin and piston being substantially coaxial, said latch pin being of annular configuration and presenting a release pin opening therethrough permitting a release pin to be inserted through the latch pin for engagement with said piston.

19. The latch mechanism of claim 18, including means for releasably holding said release pin in said latch pin.

20. A latch mechanism for releasably latching two components together, said latch mechanism comprising:
   a latch assembly adapted for mounting on one of said components and including an elongated, generally tubular latch member having a plurality of elongated latch legs each having a generally hook-shaped end and being laterally displaceable between a latching position and a release position, and an elongated piston including a plurality of elongated slots, said piston at least partially telescoped within said latch member and selectively shiftable in opposite axial directions relative to said latch member, each of said hook-shaped ends received within a corresponding piston slot; and
   an elongated latch pin adapted for mounting on the other of said components and engaged with said latch leg for releasably latching said two components together,
   said latch member, piston and latch pin being substantially coaxially aligned.

21. A latch mechanism for releasably latching two components together, said latch mechanism comprising:
   a latch assembly adapted for mounting on one of said components and including an elongated latch member having at least one elongated latch leg laterally displaceable between a latching position and a release position, and an elongated piston shiftable in opposite axial directions relative to said latch member; and
   an elongated latch pin adapted for mounting on the other of said components and engaged with said latch leg for releasably latching said two components together,
   said latch member, piston and latch pin being substantially coaxially aligned,
   said piston having a foot adjacent one end thereof for directly engaging said other component upon shifting of the piston in one of said directions.

22. A latch mechanism for releasably latching two components together, said latch mechanism comprising:
   a latch assembly adapted for mounting on one of said components and including an elongated latch member having at least one elongated latch leg laterally displaceable between a latching position and a release position, and an elongated piston shiftable in opposite axial directions relative to said latch member; and
   an elongated latch pin adapted for mounting on the other of said components and engaged with said latch leg for releasably latching said two components together,
   said latch member, piston and latch pin being substantially coaxially aligned,
   said latch pin being of annular configuration and presenting a release pin opening therethrough permitting a release pin to be inserted through the latch pin for engagement with said piston.

23. A latch mechanism for releasably latching two components together, said latch mechanism comprising:
   a latch assembly adapted for mounting on one of said components and including an elongated latch member having at least one elongated latch leg laterally displaceable between a latching position and a release position, and an elongated piston presenting a recess therein and shiftable in opposite axial directions relative to said latch member; and
   an elongated latch pin adapted for mounting on the other of said components and received within said piston recess and engaged with said latch leg for releasably latching said two components together, said piston having a foot adjacent one end thereof for directly engaging said other component upon shifting of the piston in one of said directions,
   said latch member, piston and latch pin being substantially coaxially aligned.

24. A latch mechanism for releasably latching two components together, said latch mechanism comprising:

a latch assembly adapted for mounting on one of said components and including a latch body attachable to said one component, an elongated latch member having at least one elongated latch leg laterally displaceable between a latching position and a release position, and an elongated piston presenting a recess therein and shiftable in opposite axial directions relative to said latch member, said latch body supporting said latch member and piston and including a pneumatically movable diaphragm adjacent said piston, and an air passageway communicating with said diaphragm for delivery of pressurized air against the diaphragm in order to thereby move the diaphragm and shift said piston; and an elongated latch pin adapted for mounting on the other of said components and received within said piston recess and engaged with said latch leg for releasably latching said two components together, said latch member, piston and latch pin being substantially coaxially aligned.

25. A latch mechanism for releasably latching two components together, said latch mechanism comprising:

a latch assembly adapted for mounting on one of said components and including an elongated latch member supporting at least one elongated latch leg laterally displaceable between a latching position and a release position, and an elongated piston presenting a recess therein and shiftable in opposite axial directions relative to said latch member and said latch leg; and an elongated latch pin adapted for mounting on the other of said components and received within said piston recess and engaged with said latch leg for releasably latching said two components together, said latch member, piston and latch pin being substantially coaxially aligned, said latch pin being of annular configuration and presenting a release pin opening therethrough permitting a release pin to be inserted through the latch pin for engagement with said piston.

* * * * *